United States Patent
Benway et al.

(10) Patent No.: US 9,100,478 B1
(45) Date of Patent: Aug. 4, 2015

(54) SYSTEM AND METHOD FOR CREATING INTERACTIVE VOICE RESPONSE (IVR) DIALERS

(71) Applicant: Plantronics, Inc., Santa Cruz, CA (US)

(72) Inventors: Evan Harris Benway, Santa Cruz, CA (US); Jeff Larson, Encinitas, CA (US); Erik Perotti, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 14/201,549

(22) Filed: Mar. 7, 2014

(51) Int. Cl.
*H04M 1/64* (2006.01)
*H04M 3/493* (2006.01)

(52) U.S. Cl.
CPC .................................... *H04M 3/493* (2013.01)

(58) Field of Classification Search
CPC . H04M 3/493; H04M 15/842; H04M 15/848; H04M 2215/8133; H04M 2215/8145
USPC ................................ 379/88.01, 88.18, 88.22
See application file for complete search history.

(56) References Cited

U.S. PATENT DOCUMENTS

| 8,515,028 | B2 | 8/2013 | Berger et al. |
| 2002/0006186 | A1* | 1/2002 | Sanders ........................ 379/1.01 |
| 2004/0017898 | A1* | 1/2004 | Reynolds ..................... 379/88.18 |

OTHER PUBLICATIONS

Perotti et al., "Automated Traversal of Interactive Voice Response Systems," U.S. Appl. No. 14/169,019, filed Jan. 30, 2014, 38 pages.

* cited by examiner

*Primary Examiner* — Fan Tsang
*Assistant Examiner* — Van D Huynh
(74) *Attorney, Agent, or Firm* — Thomas L. Ewing

(57) ABSTRACT

An IVR dialer creation method and system is described that creates new IVR dialers from recorded conversations between users and target IVR systems. An IVR dialer creation server and/or an IVR dialer application records each channel communications between a user and a target IVR system. The IVR system times target IVR system messages, and converts the times into pauses for the IVR dialer. The IVR system speech recognition determines the content of target IVR system messages. The IVR system analyzes user DTMF tones or voice responses to queries from the target IVR server. The IVR system determines which of the user responses are generic for the functional task performed and which pertain to user-specific information. The IVR system then builds the new IVR dialer from the pauses and user responses leaving open the possibility for the input of user-specific information during a later communication with the target IVR system.

28 Claims, 6 Drawing Sheets

300

400

800

SYSTEM AND METHOD FOR CREATING INTERACTIVE VOICE RESPONSE (IVR) DIALERS

REFERENCE TO CO-PENDING APPLICATION

This application is related to co-pending U.S. patent application Ser. No. 14/169,019, filed Jan. 30, 2014, titled "Automated Traversal of Interactive Voice Response Systems,". This related application is incorporated herein by reference in its entirety.

FIELD

Embodiments of the invention relate to systems and methods providing interactive voice response ("IVR") functions and services. More particularly, an embodiment of the invention relates to systems and methods that facilitate the creation and maintenance of automatic IVR dialers.

BACKGROUND

Interactive voice response ("IVR") systems allow computers to interact with humans by using input means such as voice and DTMF tones. The IVR systems typically provide verbal information to the user, and the user typically provides a verbal and/or a DTMF response to queries by the IVR system, depending on the configuration of the IVR system.

IVR systems are used commonly as customer support tools. In telecommunications, IVR systems allow customers to interact with a company's customer interaction computing system (e.g., for functions such as obtaining bank balances and finding flight arrival times) via a telephone keypad and/or by speech recognition which allows users to service their own inquiries by following the IVR dialogue. IVR systems deployed in a network are typically sized to handle large call volumes, e.g., handling all the flight schedule queries for an international airline. IVR technology is also being introduced into automobile systems for hands-free operation. Current deployment in automobiles involves satellite navigation, audio and mobile phone systems.

IVR systems can interact with users by employing prerecorded or dynamically generated audio to instruct users how to proceed in completing the specific functional task(s) that the user is trying to accomplish. IVR systems can be used to provide almost any function where the interface can be broken down into a series of relatively simple interactions for the user to follow. Conventional IVR systems tend to be customized for specific companies and applications while typically residing in a framework that generally ubiquitous across all systems.

Attempts to solve these problems in the prior art have tended to be either overly complicated, overly expensive, or both. To further complicate matters, many corporations outsource to third party vendors sizeable aspects of their IVR system operations which complicates the process of developing a tailored IVR systems for a given corporation since so many aspects of the IVR systems are unique to the specific IVR system and its customer. IVR systems provided great improvements over operator-driven systems from the past, but the new area of computerized mobile communications—both smartphones and softphones on operating computers—allows opportunities to make the legacy IVR systems function even more efficiently, as users have the potential for being able to complete functional tasks with IVR systems without having the necessity for spending any time themselves engaging in telephone conversation with the IVR—apart from the possibility of spending a minimal amount of time entering some very user-specific information. The lost industrial productivity from workers being placed on hold while trying to conduct operations on an IVR system is tremendous, and overall productivity would likely increase if the functional tasks performed using IVR systems could be automated still further. A simple and robust solution is called for that makes IVR systems and customized IVR systems more ubiquitous, easier to develop, and easier to maintain.

SUMMARY OF THE INVENTION

Embodiments of the invention provide a system for creating an interactive voice response (IVR) dialer for a target IVR system. The system comprises a transceiver on a computerized IVR dialer creation server configured to establish a first audio channel communication with a remote communication device operated by a user and also configured to establish a second audio channel communication with the target IVR system, wherein the user provides the IVR dialer creation server with an address for establishing the second audio channel communication to the target IVR system. The system also includes a dialer recorder on the computerized IVR dialer creation server configured to record the first audio channel communication in a first channel data file and save the first channel data file in a computer accessible data repository, wherein the first audio channel communication comprises a plurality of first audio channel messages from the user to the target IVR system, and configured to record the second audio channel communication in a second channel data file and save the second channel data file in the computer accessible data repository, wherein the second audio channel communication comprises a plurality of second channel audio messages from the target IVR system to the user. The system additionally comprises a computerized timer on the IVR dialer creation server configured to determine a plurality of time lengths for the plurality of second channel audio messages from the second audio channel, wherein a time length for each second channel audio message equals a pause time between two messages from the first audio channel. The system further includes a computerized speech analyzer on the IVR dialer creation server configured to determine message content for the plurality of second channel audio messages from the target IVR system. The system also includes a computerized DTMF analyzer on the IVR dialer creation server configured to identify DTMF tones and/or voice responses input by the user in the first audio channel messages wherein the DTMF tones and/or voice responses input by the user correspond to responses to queries posed by the target IVR system. The system comprises a computerized script constructor on the IVR dialer creation server configured to assemble an IVR data file for the IVR dialer that inserts identified DTMF tones and/or voice commands into the IVR data file and interspersing between the identified DTMF tones and/or voice commands the pause times for the second audio channel, wherein the assembled IVR dialer can be accessed by a computer program that uses the IVR dialer to perform a task with the target IVR system.

Embodiments of the invention also provide a method for creating an interactive voice response (IVR) dialer for a target IVR system. The method comprises establishing a first audio channel communication by a transceiver on a computerized IVR dialer creation server between the computerized IVR dialer creation server and a remote communication device having a computerized dialer creation application operated by a user. The method also comprises recording the first audio channel communication in a first channel data file by a dialer recorder on the computerized IVR dialer creation server and saving the first channel data file in a computer accessible data repository, wherein the first audio channel communication comprises a plurality of first channel audio messages from the user to the target IVR system. The method further comprises establishing a second audio channel communication by the transceiver between the IVR dialer creation server and the target IVR system, wherein the user provides the IVR dialer creation server with an address for establishing the second audio channel communication to the target IVR system. The method additionally comprises recording the second audio channel communication by the dialer recorder in a second channel data file and saving the second channel data file in the computer accessible data repository, wherein the second audio channel communication comprises a plurality of second channel audio messages from the target IVR system to the user. The method includes determining time lengths for the plurality of second channel audio messages using a computerized timer on the IVR dialer creation server, wherein a time length for a second channel audio message equals a pause time between two messages for the first audio channel message to be transmitted from the target IVR system to the user. The method also includes determining message content for the plurality of second channel audio messages from the target IVR system using a computerized speech recognition unit on the IVR dialer creation server. The method comprises identifying DTMF tones and/or voice commands input by the user in the plurality of first channel audio messages, wherein the DTMF tones and/or voice commands input by the user correspond to responses to queries posed by the target IVR system in at least one message of the plurality of second audio channel messages. The method further comprises assembling an IVR data file for the IVR dialer by a computerized script constructor on the IVR creation server by inserting identified DTMF tones and/or voice commands into the IVR data file and interspersing between the identified DTMF tones and/or voice commands the pause times for the second audio channel, wherein the assembled IVR dialer can be accessed by a computer program that uses the IVR dialer to complete a functional task with the target IVR system.

DETAILED DESCRIPTION OF AN EMBODIMENT OF THE INVENTION

Figure 1:
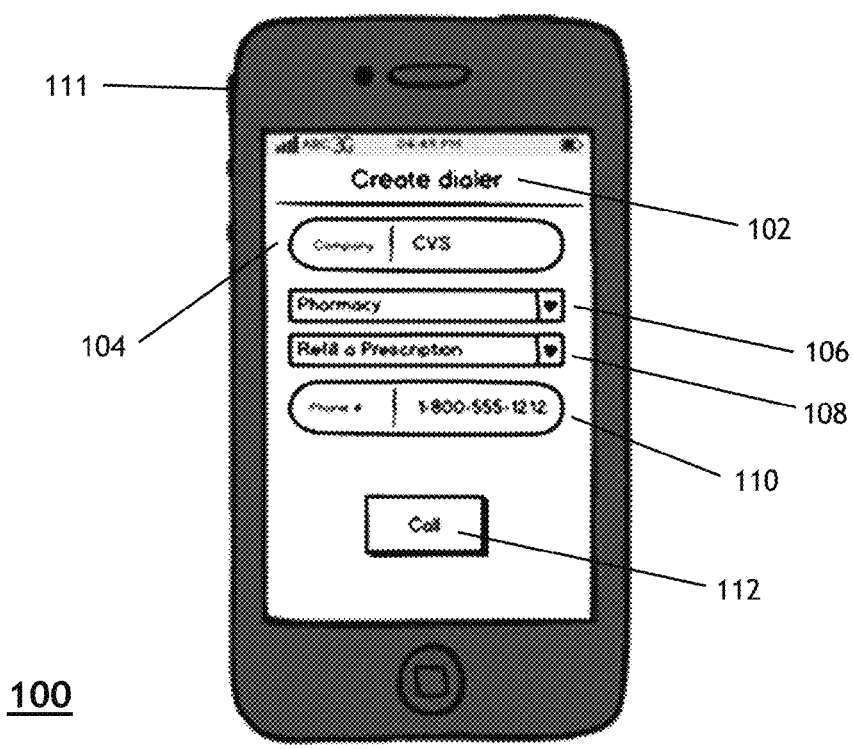
FIG. 1 illustrates an IVR dialer creation system 100 in which a mobile phone 111 has an IVR dialer creation application 102 used in the creation of a new IVR dialer, according to an embodiment of the invention.

Embodiments of the invention may enhance the ability of interactive voice response (IVR) systems to service users over various communications channels, particularly mobile telephony channels. By simplifying the creation of IVR dialers, embodiments of the invention may extend the utility of IVR dialers, particularly on mobile platforms. IVR dialers are computer programs that automate or partially automate a user's interactions with an IVR system. IVR dialers may be particularly helpful on smartphones and computers having softphone applications. Embodiments of the invention may assist in turning user-machine IVR interactions into a simple actuation of a button on a computing system (e.g., pressing an IVR dialer icon as the only human step required in renewing a prescription as opposed to conventional systems that involve telephoning the pharmacy's IVR system and engaging with it over the telephone.)

Embodiments of the invention focus on IVR dialer creation and maintenance. Embodiments of the invention create a streamlined process for creating and maintaining IVR dialers for IVR systems. "Users" as used herein include parties such as engineers/managers assigned the task of creating an IVR dialer for distribution to end users for a given IVR system as well as parties such as end users who create their own IVR dialers to simplify aspects of their interactions with external IVR systems. Simplifying the creation of IVR dialers saves the user substantial time and effort. Maintaining quality IVR dialers prevent negative end user experiences and encourages end users to use IVRs more frequently.

Embodiments of the invention aim to simplify the process of creating IVR dialers for users who build IVR dialers for distribution to others, such as end users. In other words, a programmer who works for a large chain of retail pharmacies might be the user for various embodiments of the invention. Of course, embodiments of the invention are equally accessible to third parties who build IVR dialers for some other purpose and/or for end users who build IVR dialers to simplify their own daily routines.

Mobile platforms are particularly amendable to automated and semi-automated interactions with IVR dialers since these mobile devices not only have ready access to an audio communications channel (e.g., a telephone capability), but the typical mobile phone also includes a CPU that has been configured to execute computer programs. Thus, a computer program on the mobile phone, known as an IVR dialer, can be engaged to complete a functional task for the end user on an IVR system (e.g., renewing a drug prescription). In some situations, the task performed by the IVR dialer can be completed for the end user without the need for the end user to personally interact with the IVR.

In other words, the end user selects an IVR dialer (e.g., an IVR dialer to renew a pharmaceutical prescription at a local pharmacy), and the IVR dialer then interacts with the IVR system automatically without requiring any further action on the end user's part (e.g., select "renew prescription 5"). When the IVR dialer has completed its operations, the user receives a note from the IVR dialer regarding the overall status (e.g., "Prescription renewed; pick up after 5 p.m.").

Thus, an IVR dialer can (e.g., with as little effort as a single tap on the glass of a smartphone to engage a program) dial into an IVR system and perform a variety of actions. For example, an IVR dialer on a mobile platform could be configured to dial into an IVR system, navigate the IVR system's user menu, and connect the end user directly to an operator. In another example, the IVR dialer can phone into a bank's IVR system, navigate the menu to the transfer funds function, retrieve private end user information stored locally on the mobile phone (e.g., bank account number, password, etc.), input that information into the IVR system, and transfer funds.

Of course, the IVR dialers do not necessarily need to operate on a mobile platform exclusively. The IVR dialers can operate on any computerized system that also has the ability to establish a communications link with an IVR system. So, for example, a desktop computer having a softphone could use an IVR dialer to interact with an IVR system.

The IVR dialer benefits end users by streamlining and consolidating the navigation of IVR menus. The IVR dialer may even improve IVR systems by increasing IVR dialer completion rates and giving companies using IVR systems increased control over how their customers' calls are handled. By speeding the rate at which IVR interactions complete, IVR dialers could also significantly reduce port usage for IVR systems. For large IVR system customers like the Bank of America reducing port usage could save the company a significant amount of money.

An IVR dialer's operations are based on the components of a human's interaction with an IVR system. These components are: a series of tones (e.g., DTMF tones), pauses (e.g., to cover instances where the IVR system is providing information to the human user), and possibly voice commands (e.g., to replicate the voice entries provided by a human interacting with an IVR system). Together this information comprises the "IVR dialer".

For example, an IVR dialer designed to run on a computer and communicate with an IVR system to perform the task of checking an end user's account balance at Acme Bank balance might look like this:

a) Enter DTMF tones for "1-800-555-1212" (e.g., Acme Bank's IVR phone number);
b) Set a timer to pause 6 seconds (e.g., while the IVR system says, "Welcome to Acme Bank . . . Press 1 for English . . . .");
c) Enter DTMF tones for "1" (e.g., Press 1 for English)
d) Set a timer to pause 3 seconds (e.g., while the IVR system says, "To check your account balance, press 4 or say "account".)
e) Play a recording that says "Account" (e.g., the command function expected by the IVR system) or alternatively engage a voice synthesizer to say "Account";
f) Set a timer to pause 3 seconds (e.g., while the IVR says, "Enter your account number");
g) Enter the DTMF tones "12345" (e.g., the user's account number);
h) Engage a voice recognition sub-system (e.g., to translate the bank's spoken report of the user's account balance of $4,322.15 into equivalent textual information); alternatively, or in addition to the text information, an audio recording could also be given to the user that provides the relevant information from the call with the IVR system; and
i) Prepare and send a status message to the user containing the user's account balance (e.g., a text message stating that the user's account balance at Acme Bank is $4,322.15).

In the prior art, there are two known methods for IVR dialer creation, the direct method and the spider method. Both methods have several drawbacks that limit their utility and general applicability.

In the direct method, the human author of the IVR dialer creates the IVR dialer directly in a specialized application or via a web-based dashboard. The author must first connect with (e.g., dial) into the target IVR and determine the sequence of DTMF tones, pauses, and voice commands to be replicated by the new automated IVR dialer.

The author then manually enters that IVR dialer information into the application directly or uses the web-based dashboard. The author typically notates the fields of the IVR dialer that contain user-specific, private information that should be requested from each individual IVR dialer subscriber.

There are three major problems with this prior art method. The demands made of the IVR dialer author are substantial. The author must carefully analyze details of a call, such as DTMF tone sequences, pause durations, voice commands, and then manually convert them into IVR dialer sequences for the IVR dialer. IVR dialer sequences are often very long and the author must manually record the sequence outside of the IVR dialer.

The direct method is also error prone. IVR dialer authors are likely to make mistakes in measuring IVR call details like pause durations and tone sequences. In addition, changes to the IVR menu will cause the IVR dialers created using this method to fail if they are not routinely examined for update and maintenance.

The spider method has drawbacks equally as unappealing as those of the direct method. In the spider method, an automated IVR mapping system connects with (e.g., dials into) a target IVR system. Using a combination of speech recognition software and automated dialing, a spider IVR mapping system navigates through the IVR menu, mapping the structure of the IVR system along the way. One such spider system was created by the company FonCloud, Inc., and is described in U.S. Pat. No. 8,515,028.

There are several advantages to spider systems. For one, spider systems automate the IVR dialer creation process, thus relieving the user from the burden of authorship. Spider systems also allow for frequent "IVR dialer upkeep," so that the quality of IVR dialers can be maintained. Finally, spider systems also allow the owner of the IVR system to provide company-specific as well as industry-wide IVR metrics such as average time to completion, IVR menu complexity, and frequency of IVR menu updates.

The problem with the spider method is that it can only navigate through certain types of target IVR systems. If, for example, Acme Bank's IVR system requests user-specific, private information such as a bank account number, the spider system cannot provide a response to the bank's query and will fail.

In contrast to the direct and spider methods, embodiments of the invention here provide a system and method for creating IVR dialers that aim to resolve the problems identified above. Embodiments of the invention essentially eavesdrop on the user's call with a target IVR system and analyze the call with the target IVR system and automatically generate an IVR dialer.

FIG. 1 illustrates an IVR dialer creation system 100 in which a mobile phone 111 has an IVR dialer creation application 102 used in the creation of a new IVR dialer, according to an embodiment of the invention.

A user of the mobile phone 111 engages the IVR dialer creation application 102 to create a new IVR dialer, according to an embodiment of the invention. In alternate embodiments of the invention, the user may create new IVR dialers using a computer having a softphone, and in still other embodiments of the invention, the user may use a regular telephone to engage the creation of new IVR dialers.

As shown in FIG. 1, the IVR dialer creation application 102 has been engaged on the mobile phone 111. The IVR dialer creation application 102 allows the user to preselect certain background information for the new IVR dialer that can be provided to an IVR dialer creation server, such as the dialer creation server 208 shown in FIG. 2.

The background information collected by the IVR dialer creation application 102 can include data such as a name 104 of the company or organization associated with the new IVR dialer. This information can be provided to the user via a number of ways, but as shown in FIG. 1, the user may type in the name 104 and/or select it from a scrollable list. As shown in FIG. 1, the name 104 is associated with the pharmacy CVS.

Background information can also include industry and/or topical information 106. As shown in FIG. 1, the industry/topical information 106 selected by the user pertains to a "pharmacy." The user may type in the information 106 and/or select it from a scrollable list, according to various embodiments of the invention. The industry/topical information 106 may be automatically populated by the IVR dialer creation application 102, according to an embodiment of the invention. For example, if the user selects "Bank of America" in the name 104, then the IVR dialer creation application may determine that "banking" is the pertinent category and automatically populate the industry/topical information 106 with items/tasks appropriate to the banking industry, according to an embodiment of the invention.

Background information collected by the IVR dialer creation application 102 can also include a functional task description 108 for the new IVR dialer to perform. As shown in FIG. 1, the user has selected the functional task description 108 related to the task of "refill a prescription." The user may type in the function 108 and/or select it from a scrollable list in various embodiments of the invention.

The user provides a telephone number 110 to the IVR dialer creation application 102 for the target IVR system, according to an embodiment of the invention. As shown in FIG. 1, the user has selected or entered the number 1-800-555-1212. The user may type in the number 110 or select it from a scrollable list provided by the IVR dialer creation application 102 in various embodiments of the invention. The number 110 may be automatically populated by the IVR dialer creation application 102, according to an embodiment of the invention. For example, if the user selects "Bank of America" in the name 104, then the IVR dialer creation application 102 may find and load a list of pertinent phone numbers for IVR system banking with the Bank of America and automatically populate the number 110 with numbers appropriate to the selected bank and/or related entities, according to an embodiment of the invention.

Thus, the background information collected by the IVR dialer creation application 102 for the new IVR dialer in the example shown in FIG. 1 includes the name of the company 104 associated with the new IVR dialer, the industry 106 associated with the new IVR dialer, the functional task 108 to be performed by the new IVR dialer, and the telephone number 110 of the target IVS system, according to an embodiment of the invention.

Figure 2:
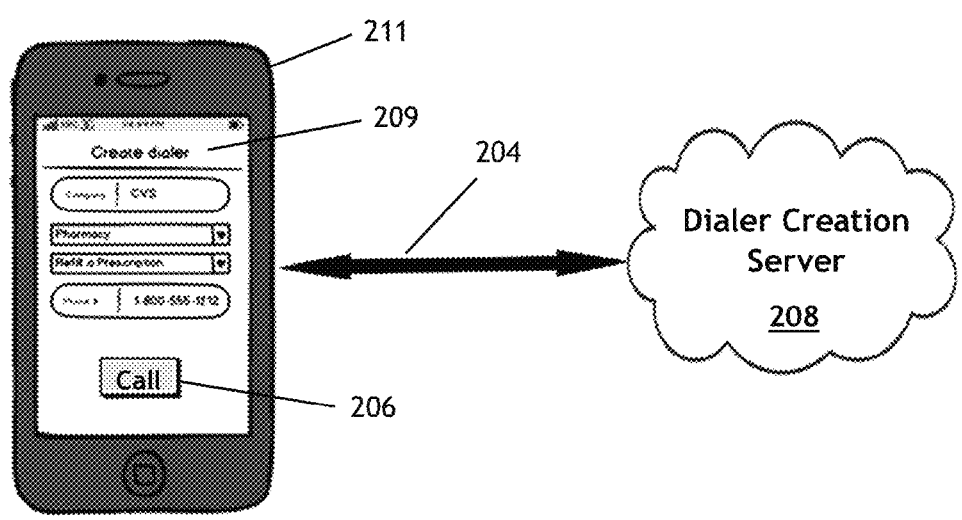
FIG. 2 illustrates an IVR dialer creation system 200 having an IVR dialer creation application 209 that engages an IVR dialer creation server 208 over a communication link 204, according to an embodiment of the invention.

FIG. 2 illustrates an IVR dialer creation system 200 having an IVR dialer creation application 209 that engages an IVR dialer creation server 208 over a communication link 204, according to an embodiment of the invention.

Once the IVR dialer creation application 209 has collected appropriate background information (e.g., the background information collection shown in FIG. 1), then the IVR dialer creation application 209 establishes a communication link 204 (e.g., a telephonic link) with the IVR dialer creation server 208. The IVR dialer creation application 209 may engage the communication 204 when the user actuates a call button 206 associated with the user interface of the IVR dialer creation application 209 and/or the mobile phone 211, according to an embodiment of the invention. The call button 206 could also be configured to engage automatically once the background information has been obtained, according to an alternative embodiment of the invention.

The IVR dialer creation application 209 has contact information for the call 204, according to an embodiment of the invention. The IVR dialer creation application 209 may have a phone number for the IVR dialer creation server 208 as a part of its background data such as the background data shown in FIG. 1. Alternatively, the IVR dialer creation application 209 may have an address for a website associated with the IVR dialer creation server, and the communication 204 actually represents a connection over a network, such as the Internet, at a sufficient bandwidth that audio transmissions may be delivered from the mobile phone 211 to the IVR dialer creation server 208 in approximately real time, according to an embodiment of the invention.

The IVR dialer creation application 209 provides the dialer creation server 208 with the collected background information that will be used to build the new IVR dialer, e.g., the background information collected in FIG. 1.

Figure 3:
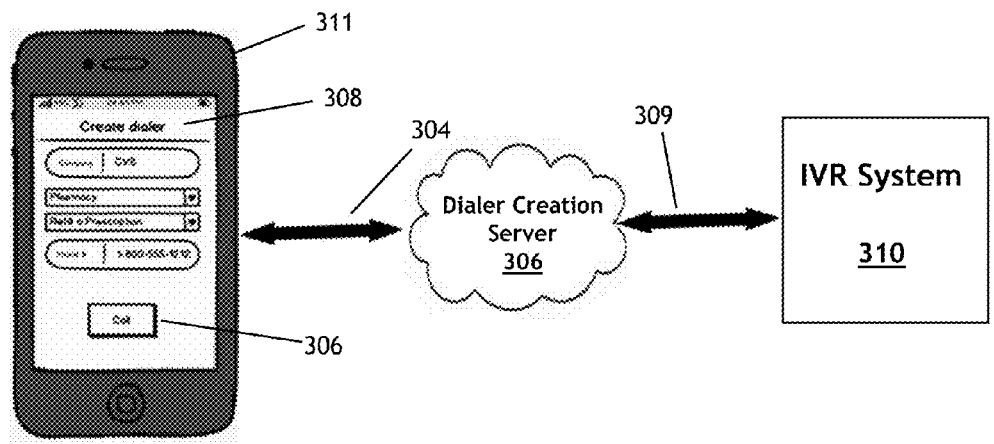
FIG. 3 illustrates an IVR dialer creation system 300 that comprises a dialer creation server 306 that engages a communication with a target IVR system 310 as well as a communication with a mobile phone 311 having a IVR dialer creation application 308, according to an embodiment of the invention.

As shown in FIG. 3, an IVR dialer creation system 300 comprises a dialer creation server 306 that engages a communication link 309 with a target IVR system 310 as well as a communication link 304 with a mobile phone 311 having an IVR dialer creation application 308, according to an embodiment of the invention.

The dialer creation server 306 has an established communication link 304 with the mobile phone 311 having an IVR dialer creation application 308 (e.g., FIG. 2), according to an embodiment of the invention. The process of establishing a communication between an IVR dialer creation application and a dialer creation server is shown in FIG. 2, according to an embodiment of the invention. The process of collecting background information for the new IVR dialer is shown in FIG. 1, according to an embodiment of the invention.

The dialer creation server 306 establishes a communication link 309 with the target IVR system 310, according to an embodiment of the invention. The communication link 309 could be established by a telephone link, an Internet link, or via any other channel that would allow the dialer creation server 306 to access the target IVR system 310 and the commands and responses that the target IVR system 310 typically provides to customers who access the target IVR system 310.

The target IVR system 310 may be a conventional IVR system and does not require any modifications to operate with the dialer creation server 306, according to an embodiment of the invention. In other words, the dialer creation server 306 engages with the target IVR system 310 in a similar manner to that of an end user customer. The IVR creation system 300 builds new IVR dialers that will operate with the target IVR system 310, which is why the target IVR system 310 does not typically require modification to operate with an IVR dialer. In addition, the dialer creation server 306 may be operated by a person or an entity having no contractual or other arrangement with the owners and operators of the IVR system 310.

Communication links 304, 309 in the IVR creation system 300 do not have be conducted over the plain old telephone system (POTS), although this would be a natural communication channel since it is one typically accessed by customers engaging with IVR systems, such as the target IVR system 310. The communication links either between the mobile phone and the dialer creation server (e.g., the communication link 304) and/or the communication link between the dialer creation server and the target IVR system (e.g., the communication link 309) could be via other communication channels, such as the Internet or even a series of cables such as USB cables—provided the target IVR system interacted with the IVR creation system 300 in the same manner that it interacts with human customers who access the system.

Figure 4:
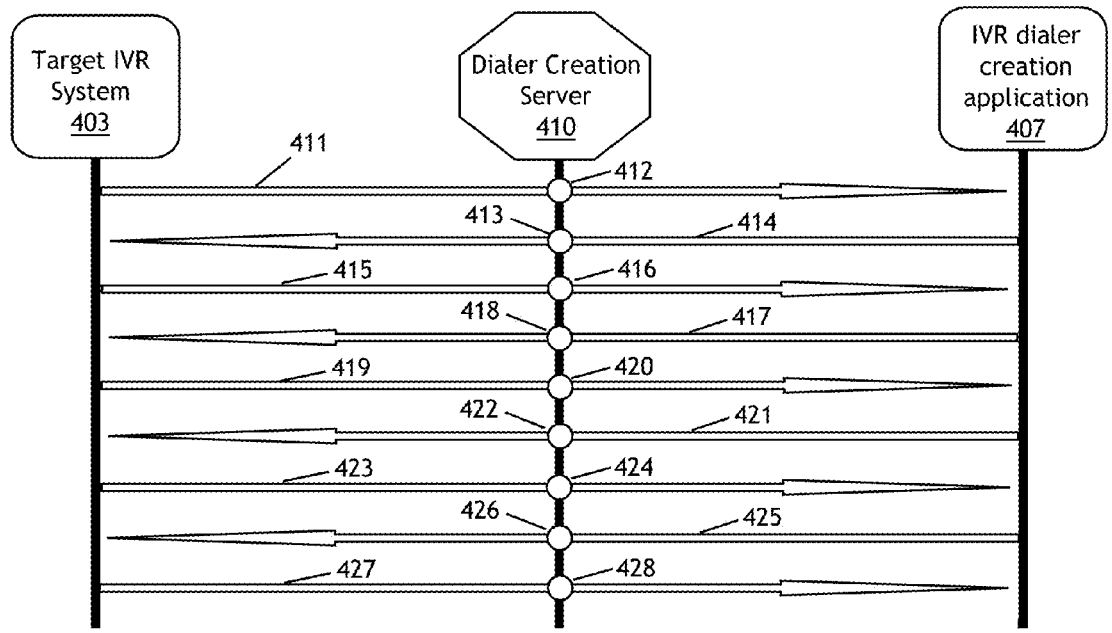
FIG. 4 illustrates a communication diagram 400 that shows communications recorded by a dialer creation server (e.g., the dialer creation server 306 shown in FIG. 3) in the process of creating a new IVR dialer, according to an embodiment of the invention.

FIG. 4 illustrates a communication diagram 400 that shows communications recorded by a dialer creation server (e.g., the dialer creation server 306 shown in FIG. 3) in the process of creating a new IVR dialer, according to an embodiment of the invention. In some embodiments, the dialer creation server records each side of different communications channels.

Conversations between users and IVR systems tend to be in one direction at any time (e.g. either the IVR system is communicating to the user or the user is communicating to the IVR system) but not typically in both directions concurrently. After the connection is established, the conversation typically starts with a message, or perhaps multiple messages, from the target IVR system 403.

The target IVR system 403 eventually sends a message 411 that requests information of some sort from the user and/or the IVR dialer creation application 407. The Dialer Creation Server 410 records 412 the message 411 as it passes through the dialer creation server 410 en route to the IVR dialer creation application 407. The Dialer Creation Server 410 employs speech recognition tools to determine the content of the message 411 (e.g., "For English, press 1. Para español, marque 2.") of the message 411, according to an embodiment of the invention. The dialer creation server 410 also employs a timer to determine the length of the message 411.

The Dialer Creation Server 410 records 413 the user's response 414 (e.g., a DTMF tone for "1"). For example, the Dialer Creation Server 410 employs DTMF technology to determine that the user has selected one. Where the Target IVR system 403 accepts voice responses, the Dialer Creation Server 410 may employ speech recognition technology to determine the user's response if the user is instructed to respond by voice rather than by pressing phone buttons, according to an embodiment of the invention.

The Dialer Creation Server 410 records 416 the Target IVR System's 403 next message 415 (e.g., "If you would like to refill an existing prescription, press 1.") to the user via the IVR dialer creation application 407. The dialer creation server 410 employs a timer to determine the length of the message 415. The Dialer Creation Server 410 also employs speech recognition technology to determine the content of the message 415.

The Dialer Creation Server 410 records 418 the user's response 417 (e.g., DTMF tones for "1") to the communication 415. The Dialer Creation Server 410 employs DTMF technology to determine that the user has selected one. Where the Target IVR system accepts voice responses, the Dialer Creation Server 410 may employ speech recognition technology, according to an embodiment of the invention.

The Dialer Creation Server 410 records 420 the Target IVR system's 403 next message 419 (e.g., "Please enter your CVS pharmacy prescription number.) The Dialer Creation Server 410 uses speech recognition technology to determine the content of the message 419. The dialer creation server 410 also employs a timer to determine the length of the message 419.

The Dialer Creation Server 410 records 422 the user's reply message 421 (e.g., DTMF tones corresponding to "444555666777"). The Dialer Creation Server 410 employs DTMF technology to determine that the user has entered prescription number 444555666777. Where the Target IVR system 403 accepts voice responses, the Dialer Creation Server 410 may employ speech recognition technology if the user is expected by the target IVR system 403 to provide a voice response, according to an embodiment of the invention.

The Dialer Creation Server 410 records 424 the next message 423 (e.g., "Please enter the last four digits of the patent's social security number.") from the Target IVR system 403. The Dialer Creation Server 410 uses speech recognition technology to determine the content of the message 423, according to an embodiment of the invention.

The Dialer Creation Server 410 records 426 the communication 425 (e.g., DTMF tones for "8361") from the user. The Dialer Creation Server 410 employs DTMF technology to determine that the user has entered the last four digits of a social security number ending in 8361. Where the Target IVR system 403 accepts voice responses, the Dialer Creation Server 410 may employ speech recognition technology, according to an embodiment of the invention.

The Dialer Creation Server 410 records 428 the message 427 (e.g., "Thank you. Your order will be ready after 4 p.m. this afternoon. You're lucky to have such a great pharmacy. Bye.") from the Target IVR system 403. The Dialer Creation Server 403 uses speech recognition to determine the content of the message 423. The Dialer Creation Server 403 prepares a formatted status message for the user based on the content of the message 423, according to an embodiment of the invention. This formatted status message may be delivered to the user by audio and/or by text.

The Dialer Creation Server 410 can then construct the new IVR dialer using the responses from the user 414, 417, 421, 425 interspersed with pauses roughly equaling the length of the communications 411, 415, 419, 423, 427 from the Target IVR System 403, according to an embodiment of the invention.

The Dialer Creation Server's 410 analysis of the messages from the Target IVR system 403 can be used to provide the user of the new IVR dialer with pertinent information provided by the target IVR system 403 related to the functional task performed by the target IVR system 403. In the example provided above, for instance, the Target IVR system 403 provided a time after which the prescription would be ready. This time could be forwarded to the user in a text format and/or an audio format.

The Dialer Creation server 410 may analyze the messages 414, 417, 421, 425 to determine points where information is provided to the target IVR system 403 by the user, e.g., the point at which a prescription number is entered, according to an embodiment of the invention. As noted above, these points can be determined by the results provided by a timer to determine the length of time of a message from the target IVR system 403 and a speech recognizer to determine the content of the target IVR system's messages to the user.

Consider, for example, a dialog with a target IVR as a 1 minute-long script. There are points in that script where either a user speaks or the IVR does, with the results being flagged, parsed and recorded. One can imagine an embodiment of the invention performed in a more robust way. For example, if the user responds with a "3" to a list of options, the Dialer Creation server 410 can assume that there are options 1 and 2 as well. If the Dialer Creation server 410 employs speech-to-text processing to determine what the other options (e.g., "1" and "2") are, and the Dialer Creation server 410 could begin to identify the entire set of scripts provided by the target IVR system.

The Dialer Creation server 410 may also analyze the messages 411, 415, 419, 423, 427 to determine other functions provided by the Target IVR system 403 (e.g., the same menu for prescription renewal might also include the choices "speak to a customer representative," "hear daily specials," and "contact the photo department"). The Dialer Creation server 410 may be constructed to offer an autonomous analysis function to explore other possibilities for the Target IVR system 403, according to an embodiment of the invention. These alternatives can be used to create a meta-IVR dialer for the Target IVR system 403 that includes the possibility for completing multiple functional tasks for the user with the target IVR system 403, according to an embodiment of the invention.

Figure 5:
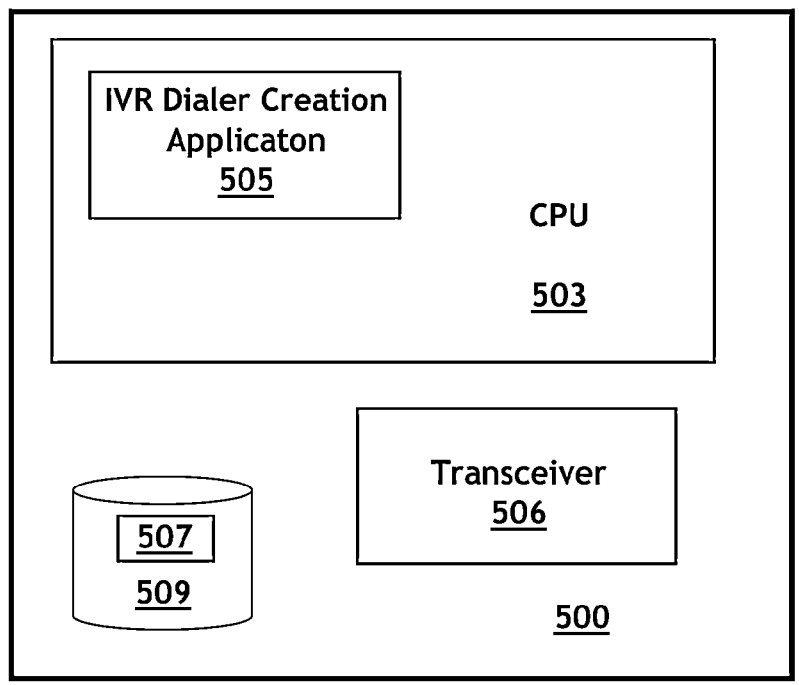
FIG. 5 illustrates a mobile phone 500 having IVR dialer creation application 505, according to an embodiment of the invention.

FIG. 5 illustrates a mobile phone 500 having IVR dialer creation application 505, according to an embodiment of the invention. The mobile phone 500 operates in a manner similar to that of other conventional mobile phones. The mobile phone 500 includes a CPU 503 that can run an IVR dialer creation application 500, according to an embodiment of the invention.

The IVR dialer creation application 505 operates in conjunction with a user of the mobile phone 500 to collect information pertinent to a call with a target IVS system. The IVR dialer creation application 505 may collect information from the user such as a phone number for activating the IVR dialer creation application 505, a user account number, a user password, and the precise functional task that the user wishes to complete with the target IVS system, according to an embodiment of the invention.

The IVR dialer creation application 505 stores the information collected in a data file 507 in a data repository 509, according to an embodiment of the invention. The mobile phone's transceiver 506 can transmit the data file 507 to the dialer creation server, such as the dialer creation server 306 shown in FIG. 3, according to an embodiment of the invention.

The IVR dialer creation application 505 can engage a transceiver 506 on the mobile phone 500 once the user has provided sufficient background information to engage the dialer creation server, according to an embodiment of the invention. The IVR dialer creation application 505 can engage the transfer of the data file 507 to the dialer creation server once the call is engaged, according to an embodiment of the invention.

Figure 6:
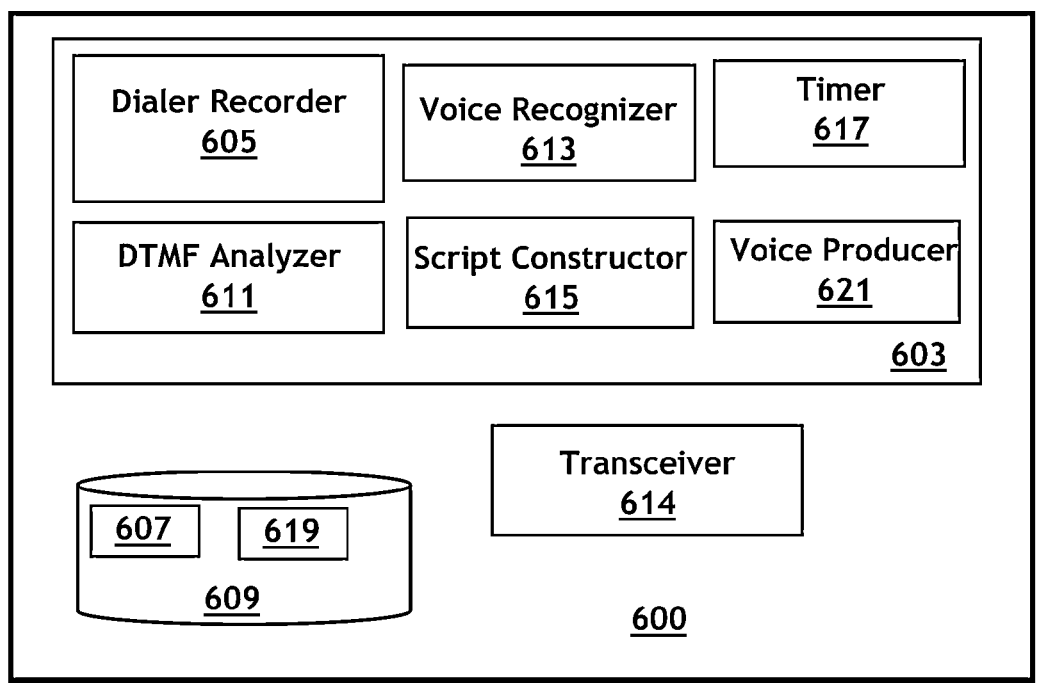
FIG. 6 illustrates a dialer creation server 600 that can be used to create new IVR dialers, according to an embodiment of the invention.

FIG. 6 illustrates a computerized dialer creation server 600 that can be used to create new IVR dialers, according to an embodiment of the invention.

The computerized dialer creation server 600 comprises a dialer recorder 605, a DTMF Analyzer 611, a voice recognizer 613, a script constructor 615, a transceiver 614, a CPU 603, a timer 617, and a data repository 609, according to an embodiment of the invention. The computerized dialer creation server may also have the ability place and receive phone calls (both domestically and internationally), according to an embodiment of the invention. The dialer creation server 600 may also physically comprise multiple computing systems configured to operate together, according to an embodiment of the invention. For example, one server could perform call and recording tasks, and send the results of the interaction that to a second server for analysis, and together these servers would comprise a dialer creation server 600, according to an embodiment of the invention.

A user-engaging device, such as the mobile phone 500 shown in FIG. 5 establishes a communication link to the dialer creation server 600. The connection may be one over a communication network such as the Internet or it may be a connection over a telephone network, such as the mobile telephony network. In the case of a mobile telephony embodiment, the mobile phone 500 uses its transceiver to establish the telephonic connection with the dialer creation server 600.

The dialer recorder 605 records each channel of the conversation between the user on a user-engaged device, such as the mobile phone 500 shown in FIG. 5, and a target IVR system, such as the target IVR system 310 shown in FIG. 3, according to an embodiment of the invention. The dialer recorder 605 stores each channel 607, 619 of a recorded conversation in the data repository 609.

The DTMF Analyzer 611 analyzes portions of the recorded phone call to find and identify any DTMF tones in the recorded conversation, according to an embodiment of the invention. The DTMF tones tend to be provided by the user in response to questions posed by the target IVR system (e.g., "What are the last 4 digits of your social security number?").

The voice recognizer 613 analyzes the recorded portion of the call that has transpired between the target IVR system and the user. Much of the voice recognizer's 613 work will be in processing the voice output from the target IVR system, although some of the work may also come from analyzing voice responses may be the user, depending upon the configuration of the target IVR system for accepting voice responses from users.

The timer 611 times the portions of the call originating from the target IVR system, according to an embodiment of the invention. Knowing how long the target IVR system's messages are will prevent the new IVR dialer from providing information to the target IVR system while the target IVR system is still transmitting its message to the user. Some target IVR systems can accept user responses ahead of or concurrent with the target IVR's systems message (e.g., inputting "2345" before the target IVR system has finished asking for the last 4 digits of the user's social security number) but many conventional IVR systems have limitations as to how far ahead the user's responses may be in order to function properly.

The script constructor 615 reviews the recorded and analyzed session between the user and the target IVR system and constructs the new IVR dialer, according to an embodiment of the invention. For example, the timer 617 may have measured for a given target IVR system that the target IVR provides messages to the user that are 4 seconds in length, 1 second in length, 3 seconds in length, and 5 seconds in length. The script constructor 615 takes these message lengths and inserts corresponding pauses into the new IVR dialer as follows:

TABLE 1

Initial Dialer Construction

| IVR Dialer Action | Comments |
|---|---|
| Pause 4 seconds | IVR queries for user's functional task (choices: refill prescription (1), hear new drug special offers (2), speak with pharmacist (3)) |
| Pause 1 second | IVR queries for pharmacy location ("if pharmacy at 1234 S. Main Street, press 1") |
| Pause 3 seconds | IVR queries for patient social ("please enter the last 4 digits of the patient's social security number") |
| Pause 5 seconds | IVR queries for prescription ("if refill for omeprazole prescription, press 1 for another other prescription, press 2") |

For most target IVR systems, there are pieces of information captured that are public and other pieces of information captured that are private. So, the script constructor 615 is configured to discern what is nagational (e.g., open to all IVR users) and what IVR-transacted information is user specific. The script construction can share the navigational data across IVR scripts while keeping information like "user name" and "password" private. In many embodiments, the private data will not be stored on the dialer creation server 600 repository and only an IVR script template will be stored.

Table 1 above also includes comments that might be helpful for a human reviewing the script for the new IVR dialer, according to an embodiment of the invention. The inclusion of these comments by the script constructor 615 is not necessary but may be helpful for understanding the actions taken by the IVR dialer, and may be helpful in maintaining the IVR dialer. The comments shown in Table 1 have been derived from the voice recognizer's 613 analysis of the messages output by the target IVR, according to an embodiment of the invention.

The script constructor 615 may now insert into the new IVR dialer the responses to the queries provided by the target IVR, according to an embodiment of the invention. These responses may come from the initial data file prepared by user and provided to the dialer creation server at the time of the call initiation and/or may be provided based on the analysis of the user's channel of the call by the DTMF analyzer 611 and where applicable the voice recognizer 613, according to an embodiment of the invention. Adding this analysis to the new IVR dialer updates Table 1 as follows, according to an embodiment of the invention:

TABLE 2

New IVR Dialer

| IVR Dialer Action | Comments |
|---|---|
| Pause 4 seconds | IVR queries for user's functional task (choices: refill prescription, hear new drug special offers, speak with pharmacist) |
| Enter DTMF tone for "1" | User refills prescription |
| Pause 1 second | IVR queries for pharmacy location ("if pharmacy at 1234 S. Main Street, press 1") |
| Enter DTMF tone for "1" | Corresponds to the location of the pharmacy that the user wishes to use to complete this order |
| Pause 3 seconds | IVR queries for patient social ("please enter the last 4 digits of the patient's social security number") |
| Enter DTMF tone for "2345" | Mark secure: Last 4 digits of user's social security number |
| Pause 5 seconds | IVR queries for prescription ("if refill for omeprazole prescription, press 1 for another other prescription, press 2") |
| Enter DTMF tone for "1" | Refill prescription for omeprazole |

Table 2 shows an updated portion of the new IVR dialer. A few additional steps could be added to the table, such as terminating the call by the new IVR dialer when all tasks have been completed. The new IVR dialer could also formulate a message to the end user reporting that the task had been completed, according to an embodiment of the invention.

The new IVR dialer can also note where sensitive information is provided to the target IVR dialer. As shown in Table 2, a notation is made that the last four digits of the user's social security number should be kept secure. A similar security tag could be placed on other information.

Figure 7:
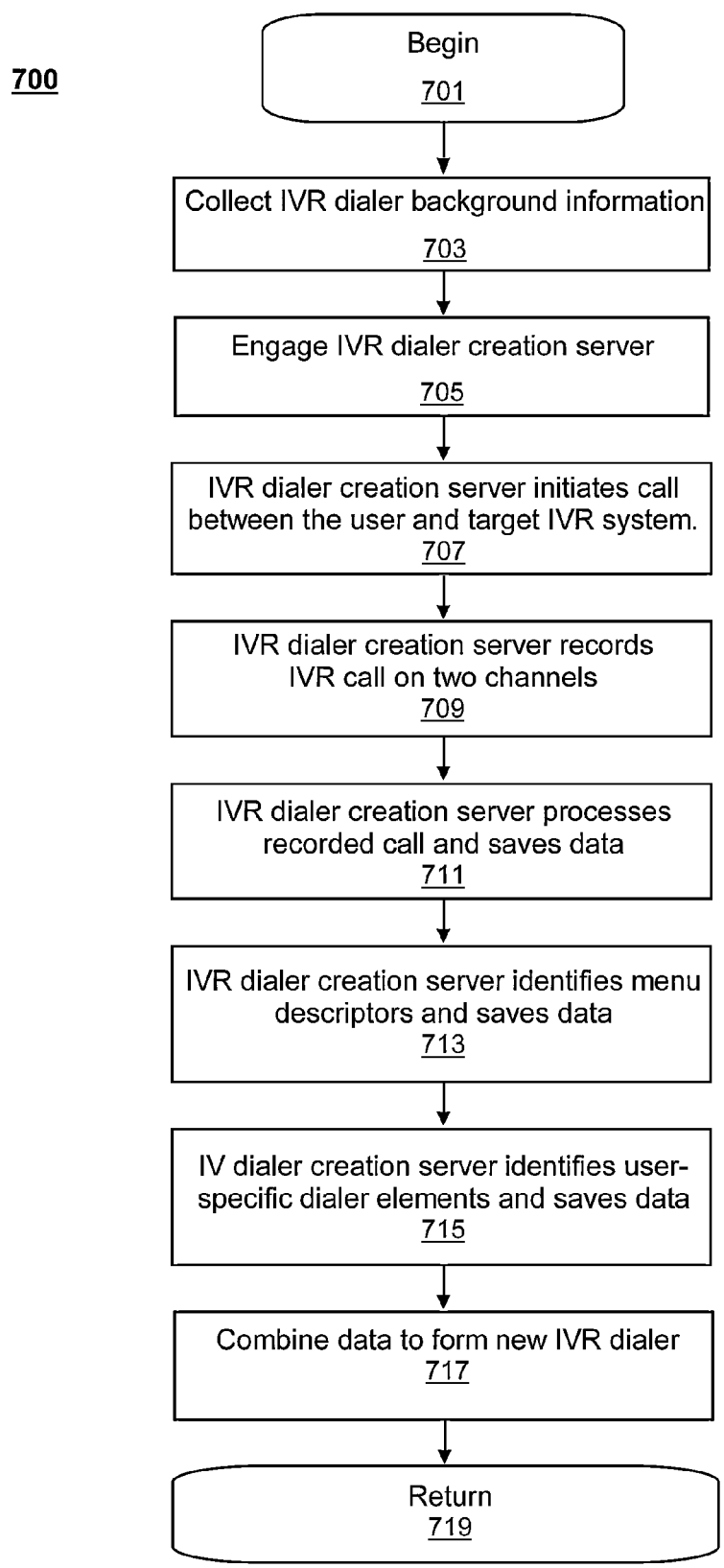
FIG. 7 provides a flowchart 700 that illustrates the process of creating a new IVR dialer, according to an embodiment of the invention.

FIG. 7 provides a flowchart 700 that illustrates the process of creating a new IVR dialer, according to an embodiment of the invention.

IVR dialer background information is collected 703 and prepared for being sent to the dialer creation server, such as the dialer creation server 306 shown in FIG. 3, according to an embodiment of the invention. Background information can be collected in a number of ways. For example, a user may engage an application, such as the IVR dialer creation application 308 shown in FIG. 3, according to an embodiment of the invention. After engaging an IVR dialer creation application, the user selects a function for creating a new IVR dialer (e.g., labeled "create a new IVR dialer."). The IVR dialer creation application then allows the user to input relevant background information for the new IVR dialer. This information could include background information such as the name of the company associated with the IVR dialer (e.g., "Plantronics"), an industry or product (e.g., "headsets"), and an IVR dialer function (e.g., "download updated headset software."). The IVR dialer creation application may also collect from the user a telephone number (or other contact identifier) for the target IVR system associated with the new IVR dialer. Background information could be collected in other ways, such as from the data file associated with the product upon dialing and/or a hybrid of these methods.

The IVR dialer creation application then engages 705 the dialer creation server, according to an embodiment of the invention. For example, the user of the mobile phone, such as the mobile phone 311 shown in FIG. 3, might actuate the phone "call" button, which will cause the mobile application dialer to phone a dialer creation server, such as the dialer creation server 306 shown in FIG. 3, according to an embodiment of the invention. Once the dialer creation server has been engaged, then the IVR dialer creation application provides the collected background information to the dialer creation server, according to an embodiment of the invention.

The dialer creation server initiates 707 a communication (e.g., a call) between the user/dialer creation application and the target IVR system and once a call has been established, the dialer creation server engages 707 a call between the user associated with the IVR dialer creation application and the target IVR system, according to an embodiment of the invention.

The dialer creation server records 709 the call between the user/dialer creation application and the target IVR system on two channels, according to an embodiment of the invention. The dialer creation server records the channel for the user/ dialer creation application separately from the channel for the target IVR. In other words, if the user says, "Account Balance," and the target IVR responds with "Checking or Savings?", the dialer creation server will record "Account Balance" separately from "Checking or Savings?"

Thus, as the user and the target IVR engage each other with the user navigating through the IVR's menu to find its pertinent functions using either voice or keypad or both, the dialer creation server will record the call made by each party, according to an embodiment of the invention.

The dialer creation server processes 711 the recorded call to recognize pauses, DTMF tones, and voice commands and saves this processed data to a data repository, such as the data repository 609 shown in FIG. 6, according to an embodiment of the invention.

For the recorded portion of the user's channel, the dialer creation server 600 recognizes pauses and/or any length of time during which the user is not entering a DTMF tone, or speaking a voice command, according to an embodiment of the invention. In some embodiments of the invention, the user may have a "talk" button presented by the IVR dialer creation application 407 that the user must tap to enter a voice command, thus eliminating the inclusion of accidental background noise as a voice command.

The dialer creation server 600 recognizes DTMF tones, according to an embodiment of the invention. DTMF communicates the numbers dialed to the dialer creation server 600 by transmitting an assigned frequency for each number. The frequency emitted when a number is dialed creates an audible tone called a "touch tone." Once identified by the dialer creation server 600, these DTMF tones can then be converted to a numeric equivalent.

The dialer creation server 600 recognizes voice commands using speech recognition software, according to an embodiment of the invention. Both trained and untrained speech recognition applications and hardware may be applied to the task such as programs like Nuance's Dragon system and even built-in speech recognition systems such as Apple's Siri, Google's voice recognition software, and even open source voice recognition systems like CMU Sphinx, according to an embodiment of the invention.

For the recorded portion of the target IVR's channel, the dialer creation server employs speech recognition software to recognize 713 IVR menu descriptions, such as "Dial 1 for English" and "Enter your account number." Once the dialer creation server has characterized the data from the target IVR's channel, the dialer creation server saves this information in a data repository, such as the data repository 609 shown in FIG. 6.

The dialer creation server's script constructor (e.g., the script constructor 611 shown in FIG. 6) uses algorithms to determine 715 whether individual IVR dialer elements (e.g., dial "12345") contain user-specific information (such as a password) or whether the information should be applied to the IVR dialer for use for a large set of users (e.g., "Dial 1 for English"). The algorithms include rules such as, "Any series of more than one DTMF tone is user-specific and private".

The dialer creation server combines 717 the data saved from each of the steps 711-715 to form a new IVR dialer, according to an embodiment of the invention. Once the IVR dialer has been created using the process described in the flowchart 700, the IVR dialer can be used by an application to automate the dialing and traversing of an IVR system. For example, assume that a customer uses a Bank of America app and sees a charge that he wants to dispute. The Bank of America app might have a button to route the user to the right piece of the Bank of America's IVR to conclude this dispute via voice, and this process could be automated, or semi-automated by application of an IVR script, according to an embodiment of the invention.

Given that the IVR dialer has securely saved private data about this user (e.g., in the data file 507 shown in FIG. 5), this same information can be reused—with the user's permission—to expand the breadth of known actions available through that target IVR system. For example, if option '2' is dialed after account number to determine account balance, the IVR dialer creation system could (with user approval) see what happens after an option '3' is pressed. This would benefit the end user by helping to expose end users to additional actions that could be simplified using this system. Finding the serial steps and the conditional steps in a target IVR system is a key idea. If the IVR dialer creation system knows a user's social security number, then with the user's permission, the IVR dialer creation system could traverse the entire IVR and see if there are other things that could be automatically enabled by IVR scripts, according to an embodiment of the invention.

The dialer creation server may also provide for automated maintenance of IVR dialers after they have been created, according to an embodiment of the invention. A test application associated with the dialer creation server could test IVR dialers to see if they remain in working condition. If the dialer creation server and/or the test application detects a failed dial with in IVR system, that IVR dialer can be flagged, re-tested, and then updated as necessary, according to an embodiment of the invention.

Similarly, as discussed earlier, the user may receive a status message at the conclusion of the communication with the IVR system that summarizes the transaction with the IVR system (e.g., "your bank balance is $10,103.94."). In some situations, the transaction with the IVR system may fail. If the call with the IVR system has been recorded, then if the IVR dialer fails to complete its assigned task for some reason, the IVR transaction can be captured as a fail condition and the recorded call can be analyzed to determine why the action failed.

User permission may be requested to periodically use the user's private information to perform maintenance of the IVR dialers.

The IVR dialer creation system may be configured to perform tests of IVR dialers at predetermined intervals, according to an embodiment of the invention. In such tests, the IVR dialer creation system initiates a call from the dialer creation server to the target IVR system. The IVR dialer creation system may employ the chosen IVR dialer to navigate the target IVR system's menus. When user-specific, private information is required (e.g., "please enter your account number"), the IVR dialer creation system will use the information from a user to continue navigating the target IVR system, according to an embodiment of the invention.

Endpoints for this IVR navigation will be determined by an administrator to prevent actions from being taken on the user's behalf without the user's consent, according to an embodiment of the invention. For example, in the case of an IVR dialer that transfers funds between accounts at Acme Bank, the IVR dialer creation system will progress through the target IVR system until it reaches its endpoint, which in this case may be the point at which the IVR menu requests the amount to be transferred.

The IVR dialer creation system records the call on the IVR dialer creation server as it navigates through the IVR system. The IVR dialer creation system then analyzes the recording to ensure that the target IVR system has not changed its menus or the options on those menus. If the IVR system has changed, the IVR dialer creation system can alert the administrator to that fact so that the structure of the IVR dialer can be updated.

Figure 8:
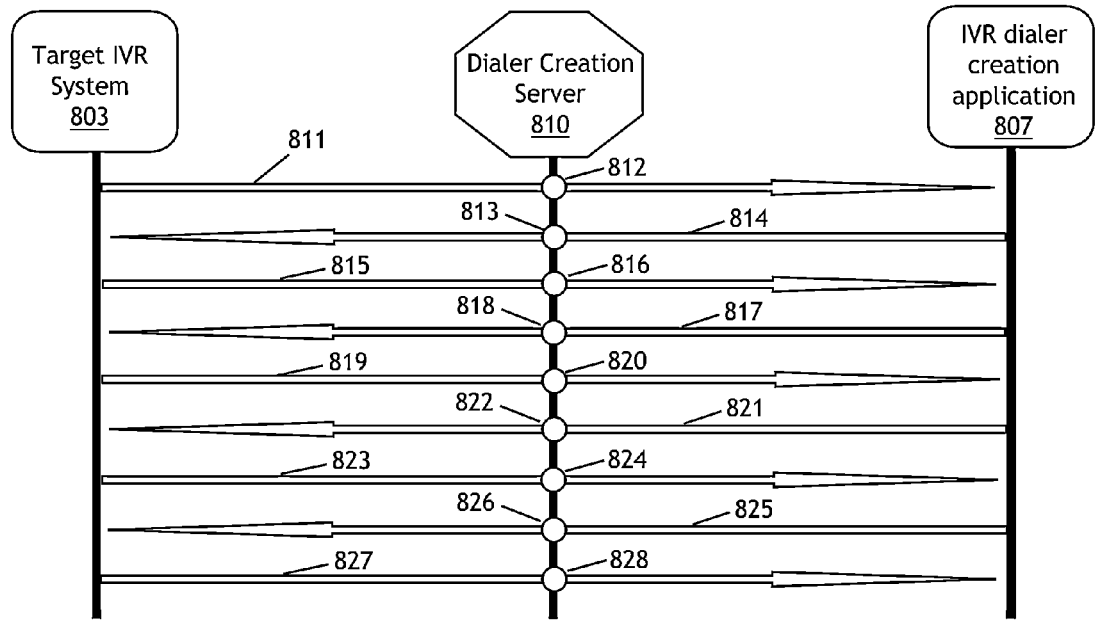
FIG. 8 illustrates a communication diagram 800 that shows communications recorded by a dialer creation server (e.g., the dialer creation server 306 shown in FIG. 3) in the process of creating a new IVR dialer, according to an embodiment of the invention.

FIG. 8 illustrates a communication diagram 800 that shows communications recorded by a dialer creation server (e.g., the dialer creation server 306 shown in FIG. 3) in the process of creating a new IVR dialer, according to an embodiment of the invention. In some embodiments, the dialer creation server records each side of different communications channels.

Conversations between users and IVR systems tend to be in one direction at any time (e.g. either the IVR system is communicating to the user or the user is communicating to the IVR system) but not typically in both directions concurrently. After the connection is established, the conversation typically starts with a message, or perhaps multiple messages, from the target IVR system 803.

The target IVR system 803 eventually sends a message 811 that requests information of some sort from the user and/or the IVR dialer creation application 807. The Dialer Creation Server 810 records 812 the message 811 as it passes through the dialer creation server 810 en route to the IVR dialer creation application 807. The Dialer Creation Server 810 employs speech recognition tools to determine the content of the message 811 (e.g., "For English, press 1. Para español, marque 2.") of the message 811, according to an embodiment of the invention. The dialer creation server 810 also employs a timer to determine the length of the message 811.

The Dialer Creation Server 810 records 813 the user's response 814 (e.g., a DTMF tone for "1"). For example, the Dialer Creation Server 810 employs DTMF technology to determine that the user has selected one. Where the Target IVR system 803 accepts voice responses, the Dialer Creation Server 810 may employ speech recognition technology to determine the user's response if the user is instructed to respond by voice rather than by pressing phone buttons, according to an embodiment of the invention.

Figure 9:
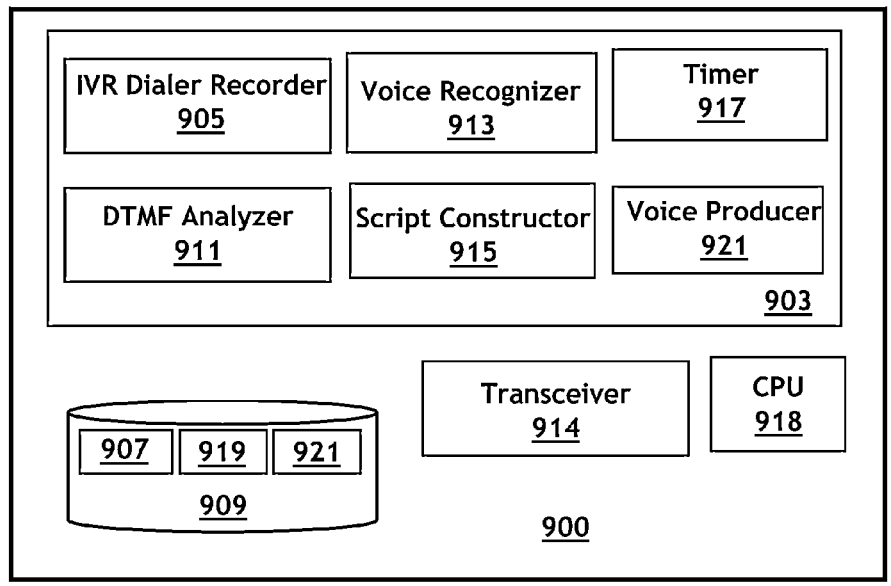
FIG. 9 illustrates a computerized dialer creation application 903 on a mobile phone 900 that can be used to create new IVR dialers, according to an embodiment of the invention.

In an alternative embodiment of the invention, the user's portion of the call is recorded locally, such as on a mobile phone associated with the user, such as the mobile phone 900 shown in FIG. 9 that includes an IVR dialer recorder 905 that can be configured to record the user's portion of the calls. For example, the DTMF tones or voice commands generated by the user can be recognized by equipment on the user's device, such as the voice recognizer 913 shown in FIG. 9, and later converted into a dialer. The Dialer Creation Server 810 may still play the role of middle man through actions such as establishing the call and listening to the far end to the target IVR system.

The Dialer Creation Server 810 records 816 the Target IVR System's 803 next message 815 (e.g., "If you would like to refill an existing prescription, press 1.") to the user via the IVR dialer creation application 807. The dialer creation server 810 employs a timer to determine the length of the message 815. The Dialer Creation Server 810 also employs speech recognition technology to determine the content of the message 815.

The Dialer Creation Server 810 records 818 the user's response 817 (e.g., DTMF tones for "1") to the communication 815. The Dialer Creation Server 810 employs DTMF technology to determine that the user has selected one. Where the Target IVR system accepts voice responses, the Dialer Creation Server 810 may employ speech recognition technology, according to an embodiment of the invention. As discussed above, in an alternative embodiment of the invention, a device local to the user (e.g., equipment on the mobile phone 900 shown in FIG. 9) may record the user's responses.

The Dialer Creation Server 810 records 820 the Target IVR system's 803 next message 819 (e.g., "Please enter your CVS pharmacy prescription number.) The Dialer Creation Server 810 uses speech recognition technology to determine the content of the message 819. The dialer creation server 810 also employs a timer to determine the length of the message 819.

The Dialer Creation Server 810 records 822 the user's reply message 821 (e.g., DTMF tones corresponding to "444555666777"). The Dialer Creation Server 810 employs DTMF technology to determine that the user has entered prescription number 444555666777. Where the Target IVR system 803 accepts voice responses, the Dialer Creation Server 810 may employ speech recognition technology if the user is expected by the target IVR system 803 to provide a voice response, according to an embodiment of the invention.

The Dialer Creation Server 810 records 824 the next message 823 (e.g., "Please enter the last four digits of the patent's social security number.") from the Target IVR system 803. The Dialer Creation Server 810 uses speech recognition technology to determine the content of the message 823, according to an embodiment of the invention.

The Dialer Creation Server 810 records 826 the communication 825 (e.g., DTMF tones for "8361") from the user. The Dialer Creation Server 810 employs DTMF technology to determine that the user has entered the last four digits of a social security number ending in 8361. Where the Target IVR system 803 accepts voice responses, the Dialer Creation Server 810 may employ speech recognition technology, according to an embodiment of the invention.

The Dialer Creation Server 810 records 828 the message 827 (e.g., "Thank you. Your order will be ready after 4 p.m. this afternoon. You're lucky to have such a great pharmacy. Bye.") from the Target IVR system 803. The Dialer Creation Server 803 uses speech recognition to determine the content of the message 823. The Dialer Creation Server 803 prepares a formatted status message for the user based on the content of the message 823, according to an embodiment of the invention. This formatted status message may be delivered to the user by audio and/or by text.

The Dialer Creation Server 810 can then construct the new IVR dialer using the responses from the user 814, 817, 821, 825 interspersed with pauses roughly equaling the length of the communications 811, 815, 819, 823, 827 from the Target IVR System 803, according to an embodiment of the invention.

The Dialer Creation Server's 810 analysis of the messages from the Target IVR system 803 can be used to provide the user of the new IVR dialer with pertinent information provided by the target IVR system 803 related to the functional task performed by the target IVR system 803. In the example provided above, for instance, the Target IVR system 803 provided a time after which the prescription would be ready. This time could be forwarded to the user in a text format and/or an audio format.

The Dialer Creation server 810 may analyze the messages 814, 817, 821, 825 to determine points where information is provided to the target IVR system 803 by the user, e.g., the point at which a prescription number is entered, according to an embodiment of the invention. As noted above, these points can be determined by the results provided by a timer to determine the length of time of a message from the target IVR system 803 and a speech recognizer to determine the content of the target IVR system's messages to the user.

The Dialer Creation server 810 may also analyze the messages 811, 815, 819, 823, 827 to determine other functions provided by the Target IVR system 803 (e.g., the same menu for prescription renewal might also include the choices "speak to a customer representative," "hear daily specials,"

and "contact the photo department"). The Dialer Creation server 810 may be constructed to offer an autonomous analysis function to explore other possibilities for the Target IVR system 803, according to an embodiment of the invention. These alternatives can be used to create a meta-IVR dialer for the Target IVR system 803 that includes the possibility for completing multiple functional tasks for the user with the target IVR system 803, according to an embodiment of the invention.

FIG. 9 illustrates a computerized dialer creation application 903 on a mobile phone 900 that can be used to create new IVR dialers, according to an embodiment of the invention. In this embodiment of the invention, the computerized dialer creation application 903 performs many of the tasks performed by the IVR dialer creation server, such as the IVR dialer creation server 600 shown in FIG. 6.

The mobile phone 900 operates in a manner similar to that of other conventional mobile phones. The mobile phone 900 includes a CPU 918 that executes the code for the computerized dialer creation application 903, according to an embodiment of the invention. The mobile phone 900 also comprises a transceiver 914 and a data repository 909, according to an embodiment of the invention.

The computerized dialer creation application 903 comprises a dialer recorder 905, a DTMF Analyzer 911, a timer 917, a voice recognizer 913, a voice producer 921, and a script constructor 915.

The mobile phone 900 establishes a communication link to a dialer creation server, such as the dialer creation server 600 shown in FIG. 6. The connection may be one over a communication network such as the Internet or it may be a connection over a telephone network, such as the mobile telephony network. In the case of a mobile telephony embodiment, the mobile phone 900 uses the transceiver 914 to establish the telephonic connection with the dialer creation server.

The dialer recorder 905 records at least one channel of the conversation between the user on a user-engaged device (here, the mobile phone 900) and a target IVR system, such as the target IVR system 310 shown in FIG. 3, according to an embodiment of the invention. The dialer recorder 905 stores each channel 907, 919 of a recorded conversation in the data repository 909.

The DTMF Analyzer 911 analyzes portions of the recorded phone call to find and identify any DTMF tones in the recorded conversation, according to an embodiment of the invention. The DTMF tones tend to be provided by the user in response to questions posed by the target IVR system (e.g., "What are the last 4 digits of your social security number?").

The voice recognizer 913 analyzes the recorded portion of the call that has transpired between the target IVR system and the user. Much of the voice recognizer's 913 work will be in processing the voice output from the target IVR system, although some of the work may also come from analyzing voice responses may be the user, depending upon the configuration of the target IVR system for accepting voice responses from users.

The timer 917 times the portions of the call originating from the target IVR system, according to an embodiment of the invention. Knowing how long the target IVR system's messages are will prevent the new IVR dialer from providing information to the target IVR system while the target IVR system is still transmitting its message to the user. Some target IVR systems can accept user responses ahead of or concurrent with the target IVR's systems message (e.g., inputting "2345" before the target IVR system has finished asking for the last 4 digits of the user's social security number) but many conventional IVR systems have limitations as to how far ahead the user's responses may be in order to function properly.

The script constructor 915 reviews the recorded and analyzed session between the user and the target IVR system and constructs the new IVR dialer, according to an embodiment of the invention. For example, the timer 917 may have measured for a given target IVR system that the target IVR provides messages to the user that are 4 seconds in length, 1 second in length, 3 seconds in length, and 5 seconds in length. The script constructor 915 takes these message lengths and inserts corresponding pauses into the new IVR dialer as follows:

TABLE 3

Initial Dialer Construction

| IVR Dialer Action | Comments |
| --- | --- |
| Pause 4 seconds | IVR queries for user's functional task (choices: refill prescription (1), hear new drug special offers (2), speak with pharmacist (3)) |
| Pause 1 second | IVR queries for pharmacy location ("if pharmacy at 1234 S. Main Street, press 1") |
| Pause 3 seconds | IVR queries for patient social ("please enter the last 4 digits of the patient's social security number") |
| Pause 5 seconds | IVR queries for prescription ("if refill for omeprazole prescription, press 1 for another other prescription, press 2") |

Table 3 also includes comments that might be helpful for a human reviewing the script for the new IVR dialer, according to an embodiment of the invention. The inclusion of these comments by the script constructor 915 is not necessary but may be helpful for understanding the actions taken by the IVR dialer, and may be helpful in maintaining the IVR dialer. The comments shown in Table 3 have been derived from the voice recognizer's 913 analysis of the messages output by the target IVR, according to an embodiment of the invention.

The script constructor 915 may now insert into the new IVR dialer the responses to the queries provided by the target IVR, according to an embodiment of the invention. These responses may come from the initial data file prepared by user and provided to the dialer creation server at the time of the call initiation and/or may be provided based on the analysis of the user's channel of the call by the DTMF analyzer 911 and where applicable the voice recognizer 913, according to an embodiment of the invention. Adding this analysis to the new IVR dialer updates Table 3 as follows, according to an embodiment of the invention:

TABLE 4

New IVR Dialer

| IVR Dialer Action | Comments |
| --- | --- |
| Pause 4 seconds | IVR queries for user's functional task (choices: refill prescription, hear new drug special offers, speak with pharmacist) |
| Enter DTMF tone for "1" | User refills prescription |
| Pause 1 second | IVR queries for pharmacy location ("if pharmacy at 1234 S. Main Street, press 1") |
| Enter DTMF tone for "1" | Corresponds to the location of the pharmacy that the user wishes to use to complete this order |
| Pause 3 seconds | IVR queries for patient social ("please enter the last 4 digits of the patient's social security number") |
| Enter DTMF tone for "2345" | Mark secure: Last 4 digits of user's social security number |

TABLE 4-continued

New IVR Dialer

| IVR Dialer Action | Comments |
|---|---|
| Pause 5 seconds | IVR queries for prescription ("if refill for omeprazole prescription, press 1 for another other prescription, press 2") |
| Enter DTMF tone for "1" | Refill prescription for omeprazole |

Table 4 shows an updated portion of the new IVR dialer. A few additional steps could be added to the table, such as terminating the call by the new IVR dialer when all tasks have been completed. The new IVR dialer could also formulate a message to the end user reporting that the task had been completed, according to an embodiment of the invention.

The new IVR dialer can also note where sensitive information is provided to the target IVR dialer. As shown in Table 4, a notation is made that the last four digits of the user's social security number should be kept secure. A similar security tag could be placed on other information.

As previously discussed, the IVR dialer creation application 903 operates in conjunction with a user of the mobile phone 900 to collect information pertinent to a call with a target IVS system. The IVR dialer creation application 903 may collect information from the user such as a phone number for the target IVR system, a user account number, a user password, and the precise functional task that the user wishes to complete with the target IVS system, according to an embodiment of the invention.

The IVR dialer creation application 903 stores the information collected in a data file 921 in a data repository 909, according to an embodiment of the invention. The script constructor 915 can use the data file 921 in building a new IVR dialer, according to an embodiment of the invention.

If necessary, the mobile phone's transceiver 914 can transmit the data file 921 to the dialer creation server, such as the dialer creation server 306 shown in FIG. 3, according to an embodiment of the invention. The transceiver 914 can also transmit the data files 907, 919 if necessary, according to an embodiment of the invention.

Figure 10:
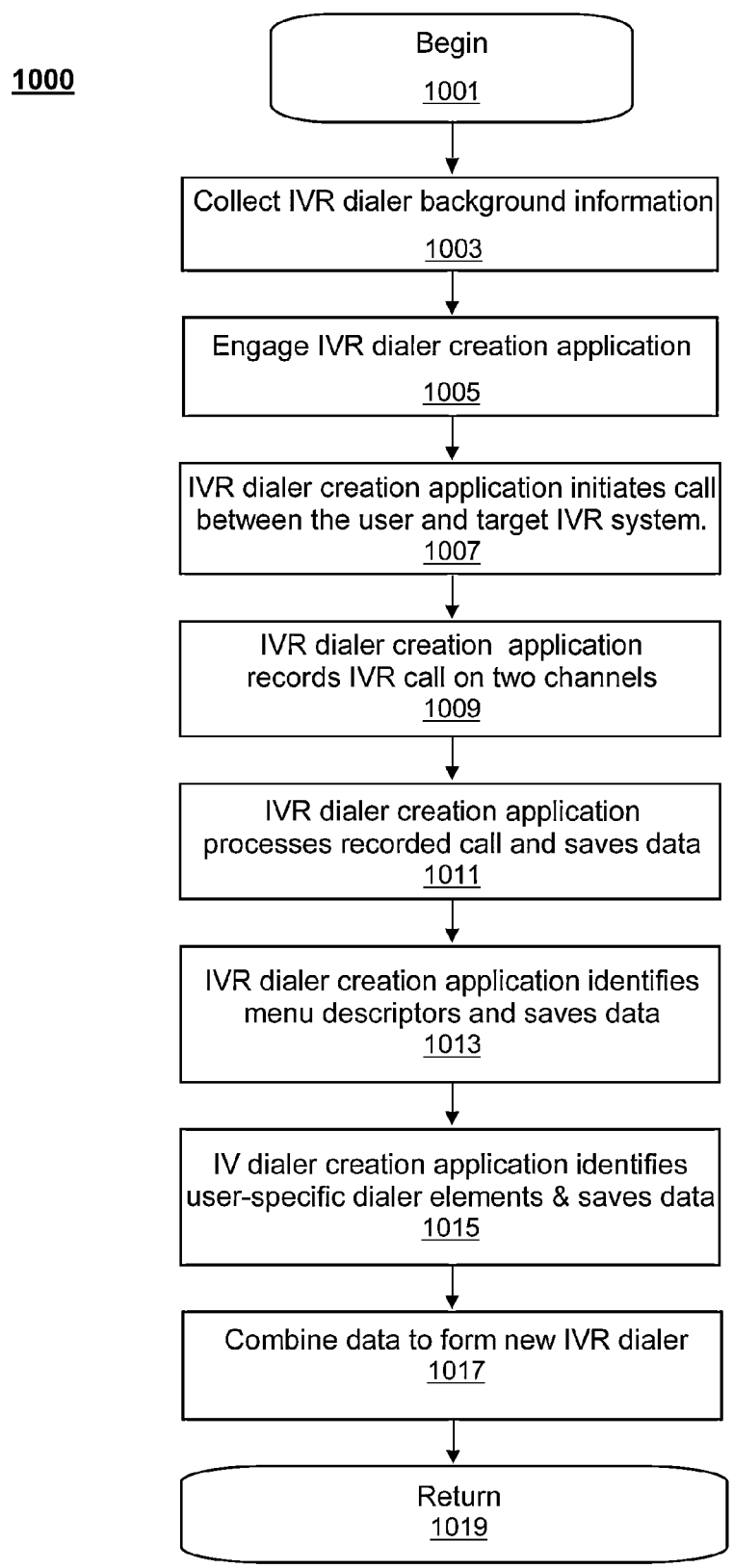
FIG. 10 provides a flowchart 1000 that illustrates the process of creating a new IVR dialer, according to an embodiment of the invention.

FIG. 10 provides a flowchart 1000 that illustrates the process of creating a new IVR dialer, according to an embodiment of the invention.

IVR dialer background information is collected 1003 and prepared for by the dialer creation application, such as the dialer creation server 903 shown in FIG. 9, according to an embodiment of the invention. Background information can be collected in a number of ways. After engaging the IVR dialer creation application, the user selects a function for creating a new IVR dialer (e.g., labeled "create a new IVR dialer."). The IVR dialer creation application then allows the user to input relevant background information for the new IVR dialer. This information could include background information such as the name of the company associated with the IVR dialer (e.g., "Plantronics"), an industry or product (e.g., "headsets"), and an IVR dialer function (e.g., "download updated headset software."). The IVR dialer creation application may also collect from the user a telephone number (or other contact identifier) for the target IVR system associated with the new IVR dialer. Background information could be collected in other ways, such as from the data file associated with the product upon dialing and/or a hybrid of these methods.

The IVR dialer creation application then engages 1005 the dialer creation server, according to an embodiment of the invention. For example, the user of the mobile phone, such as the mobile phone 900 shown in FIG. 9, might actuate the phone "call" button, which will cause the mobile application dialer to phone a dialer creation server, such as the dialer creation server 600 shown in FIG. 6, according to an embodiment of the invention. Once the dialer creation server has been engaged, then the IVR dialer creation application may provide the collected background information to the dialer creation server, according to an embodiment of the invention.

The dialer creation server initiates 1007 a communication (e.g., a call) between the user/dialer creation application and the target IVR system and once a call has been established, the dialer creation server engages 1007 a call between the user associated with the IVR dialer creation application and the target IVR system, according to an embodiment of the invention. In an alternative embodiment of the invention, the dialer creation application itself may engage the call with the target IVR system.

The dialer creation application records 1009 the call between the user/dialer creation application and the target IVR system on two channels, according to an embodiment of the invention. The dialer creation application records the channel for the user/dialer creation application separately from the channel for the target IVR. In other words, if the user says, "Account Balance," and the target IVR responds with "Checking or Savings?", the dialer creation application will record "Account Balance" separately from "Checking or Savings?" As shown in FIG. 9, the dialer creation application 903 may include an IVR dialer recorder 905.

Thus, as the user and the target IVR engage each other with the user navigating through the IVR's menu to find its pertinent functions using either voice or keypad or both, the dialer creation application records the call made by each party, according to an embodiment of the invention.

The dialer creation application processes 1011 the recorded call to recognize pauses, DTMF tones, and voice commands and saves this processed data to a data repository, such as the data repository 909 shown in FIG. 9, according to an embodiment of the invention.

For the recorded portion of the user's channel, the dialer creation application recognizes pauses and/or any length of time during which the user is not entering a DTMF tone, or speaking a voice command, according to an embodiment of the invention. In some embodiments of the invention, the user may have a "talk" button presented by the IVR dialer creation application that the user must tap to enter a voice command, thus eliminating the inclusion of accidental background noise as a voice command. The dialer creation application recognizes DTMF tones, according to an embodiment of the invention. The dialer creation application recognizes voice commands using speech recognition software, according to an embodiment of the invention. Both trained and untrained speech recognition applications and hardware may be applied to the task such as programs like Nuance's Dragon system and even built-in speech recognition systems such as Apple's Siri, Google's voice recognition software, and even open source voice recognition systems like CMU Sphinx, according to an embodiment of the invention.

For the recorded portion of the target IVR's channel, the dialer creation application employs speech recognition software to recognize 1013 IVR menu descriptions, such as "Dial 1 for English" and "Enter your account number." Once the dialer creation application has characterized the data from the target IVR's channel, the dialer creation application saves this information in a data repository, such as the data repository 909 shown in FIG. 9.

The dialer creation application's script constructor (e.g., the script constructor 915 shown in FIG. 9) uses algorithms to determine 1015 whether individual IVR dialer elements (e.g., dial "12345") contain user-specific information (such as a password) or whether the information should be applied to the IVR dialer for use for a large set of users (e.g., "Dial 1 for English"). The algorithms include rules such as, "Any series of more than one DTMF tone is user-specific and private".

The dialer creation server combines 1017 the data saved from each of the steps 1011-1015 to form a new IVR dialer, according to an embodiment of the invention. Once the IVR dialer has been created using the process described in the flowchart 1000, the IVR dialer can be used by an application on a user's mobile phone, for example, to automate the dialing and traversing of an IVR system.

Given that the IVR dialer has securely saved private data about this user (e.g., in the data file 507 shown in FIG. 5), this same information can be reused to expand the breadth of known actions available through that IVR system. For example, if option '2' is dialed after account number to determine account balance, the IVR dialer creation system could (with user approval) see what happens after an option '3' is pressed. This would benefit the end user by helping to expose end users to additional actions that could be simplified using this system.

The dialer creation application may also provide for automated maintenance of IVR dialers after they have been created, according to an embodiment of the invention. A test application associated with the dialer creation application could test IVR dialers to see if they remain in working condition. If the dialer creation application and/or the test application detects a failed dial with in IVR system, that IVR dialer can be flagged, re-tested, and then updated as necessary, according to an embodiment of the invention.

User permission may be requested to periodically use the user's private information to perform maintenance of the IVR dialers.

The IVR dialer creation application may be configured to perform tests of IVR dialers at predetermined intervals, according to an embodiment of the invention. In such tests, the IVR dialer creation system initiates a call from the dialer creation server to the target IVR system. The IVR dialer creation system may employ the chosen IVR dialer to navigate the target IVR system's menus. When user-specific, private information is required (e.g., "please enter your account number"), the IVR dialer creation system will use the information from a user to continue navigating the target IVR system, according to an embodiment of the invention.

Endpoints for this IVR navigation will be determined by an administrator to prevent actions from being taken on the user's behalf without the user's consent, according to an embodiment of the invention. For example, in the case of an IVR dialer that transfers funds between accounts at Acme Bank, the IVR dialer creation system will progress through the target IVR system until it reaches its endpoint, which in this case may be the point at which the IVR menu requests the amount to be transferred.

The IVR dialer creation system records the call on the IVR dialer creation application as it navigates through the IVR system. The IVR dialer creation system then analyzes the recording to ensure that the target IVR system has not changed its menus or the options on those menus. If the IVR system has changed, the IVR dialer creation system can alert the administrator to that fact so that the structure of the IVR dialer can be updated.

While specific embodiments of the invention have been illustrated and described, it will be clear that the invention is not limited to these embodiments only. Embodiments of the invention discussed herein may have generally implied the use of Plantronics equipment; however, the invention may be adapted for use with equipment from other sources and manufacturers. Equipment used in conjunction with the invention may be configured to operate according to a conventional computer protocol (e.g., USB) and/or may be configured to operate according to a specialized protocol (e.g., a Plantronics serial bus). Numerous modifications, changes, variations, substitutions and equivalents will be apparent to those skilled in the art without departing from the spirit and scope of the invention as described in the claims. In general, in the following claims, the terms used should not be construed to limit the invention to the specific embodiments disclosed in the specification, but should be construed to include all systems and methods that operate under the claims set forth hereinbelow. Thus, it is intended that the invention covers the modifications and variations of this invention provided they come within the scope of the appended claims and their equivalents.

We claim:

1. A system for creating an interactive voice response (IVR) dialer for a target IVR system, comprising:
   a transceiver configured to establish a first audio channel communication with a remote communication device operated by a user and also configured to establish a second audio channel communication with the target IVR system, wherein the user provides an address for establishing the second audio channel communication to the target IVR system;
   a computerized dialer recorder configured to record the first audio channel communication in a first channel data file and save the first channel data file in a computer accessible data repository, wherein the first audio channel communication comprises a plurality of first audio channel messages from the user to the target IVR system, and configured to record the second audio channel communication in a second channel data file and save the second channel data file in the computer accessible data repository, wherein the second audio channel communication comprises a plurality of second channel audio messages from the target IVR system to the user;
   a computerized timer configured to determine time lengths for each second channel audio message of the plurality of second channel audio messages, wherein a time length for each second channel audio message corresponds to a pause time between two first channel audio messages of the plurality of first channel audio messages;
   a computerized speech analyzer configured to determine message content for the plurality of second channel audio messages from the target IVR system;
   a computerized DTMF analyzer configured to identify DTMF tones in the plurality of first audio channel messages wherein identified DTMF tones correspond to responses to queries posed by the target IVR system to the user;
   a computerized script constructor configured to assemble an IVR data file for the IVR dialer that inserts identified DTMF tones into the IVR data file and intersperses between the identified DTMF tones pause times corresponding to the determined time lengths for the plurality of second channel audio messages, wherein the assembled IVR dialer can be accessed by a computer program that uses the IVR dialer to perform a task with the target IVR system.

2. The system of claim 1 wherein the computerized speech recognition unit determines message content for the plurality of messages from the user on the first audio channel, wherein the messages input by the user correspond to responses to queries posed by the target IVR system, and wherein the computerized script constructor assembles the IVR data file for the IVR dialer by inserting determined messages for the plurality of first channel audio messages.

3. The system of claim 2 wherein the transceiver and at least one of the computerized dialer recorder, the computerized timer, the computerized speech analyzer, computerized DTMF analyzer, computerized script constructor, and the computerized speech recognition unit reside on a computerized dialer creation server.

4. The system of claim 2 wherein the transceiver and at least one of the computerized dialer recorder, the computerized timer, the computerized speech analyzer, computerized DTMF analyzer, computerized script constructor, and the computerized speech recognition unit reside on a computerized mobile phone.

5. The system of claim 1 wherein the computerized script constructor inserts into the IVR data file locations for user-specific data to be provided by the user to the target IVR system.

6. The system of claim 5 wherein the computerized script constructor inserts into the IVR data file for the IVR dial an identification for a user-specified data file where the user-specific data can be found when the IVR dialer requests the user-specific data for the target IVR system.

7. The system of claim 5 wherein the computerized script constructor inserts an instruction in the IVR data file for the IVR dialer to query the user for real-time input of information.

8. The system of claim 1 wherein the computerized script constructor prepares a status message for the user once a communication with the target IVR system has been completed wherein the status message describes at least one of completion status for a task performed on the target IVR system.

9. The system of claim 1 wherein the computerized script constructor annotates the IVR data file for the IVR dialer with human-readable comments that describe actions taken by at least one of the IVR dialer and the target IVR system.

10. The system of claim 1 wherein the communication between the user and a dialer creation server comprises a telephonic communication over the plain old telephone lines (POTs), and wherein the transceiver operates as a telephone switch.

11. The system of claim 1 wherein the communication between the user and a dialer creation server comprises a computerized softphone application for the user and wherein the transceiver is configured for internet communications.

12. The system of claim 1 wherein the communication between a dialer creation server and the target IVR system comprises a telephonic communication over the plain old telephone lines (POTs) and wherein the transceiver operates as a telephone switch.

13. The system of claim 1 wherein the communication between a dialer creation server and the target IVR system comprises an Internet communication and wherein the transceiver is configured to control an Internet communication.

14. The system of claim 1 wherein the computerized script constructor inserts into the IVR dialer data indicating which of the user's data should be kept confidential.

15. A method for creating an interactive voice response (IVR) dialer for a target IVR system, comprising:
    establishing a first audio channel communication by a transceiver between a computerized IVR dialer creation server and a remote communication device having a computerized dialer creation application operated by a user;
    recording the first audio channel communication in a first channel data file by a dialer recorder and saving the first channel data file in a computer accessible data repository, wherein the first audio channel communication comprises a plurality of first channel audio messages from the user to the target IVR system;
    establishing a second audio channel communication by the transceiver between the IVR dialer creation server and the target IVR system, wherein the user provides an address for establishing the second audio channel communication to the target IVR system;
    recording the second audio channel communication by the dialer recorder in a second channel data file and saving the second channel data file in the computer accessible data repository, wherein the second audio channel communication comprises a plurality of second channel audio messages from the target IVR system to the user;
    determining time lengths for the plurality of second channel audio messages using a computerized timer, wherein a time length for a second channel audio message corresponds to a pause time between two first audio channel messages of the plurality of first audio channel messages;
    determining message content for the plurality of second channel audio messages from the target IVR system using a computerized speech recognition unit;
    identifying DTMF tones in the plurality of first channel audio messages, wherein the DTMF tones input by the user correspond to responses to queries posed by the target IVR system in at least one message of the plurality of second audio channel messages;
    assembling an IVR data file for the IVR dialer by a computerized script constructor on the IVR creation server by inserting identified DTMF tones into the IVR data file and interspersing between the identified DTMF tones the pause times corresponding to the determined time lengths for the plurality of second channel audio messages, wherein the assembled IVR dialer can be accessed by a computer program that uses the IVR dialer to complete a functional task with the target IVR system.

16. The method of claim 15, further comprising:
    determining message content for the plurality of first channel audio messages from the user using the computerized speech recognition unit, wherein the messages input by the user correspond to responses to queries posed by the target IVR system; and
    assembling the IVR data file for the IVR dialer by inserting determined messages for the plurality of first channel audio messages.

17. The method of claim 15 wherein the transceiver and at least one of the computerized dialer recorder, the computerized timer, the computerized speech analyzer, computerized DTMF analyzer, computerized script constructor, and the computerized speech recognition unit reside on a computerized dialer creation server.

18. The system of claim 15 wherein the transceiver and at least one of the computerized dialer recorder, the computerized timer, the computerized speech analyzer, computerized DTMF analyzer, computerized script constructor, and the computerized speech recognition unit reside on a computerized mobile phone.

19. The method of claim 15, further comprising:
    inserting into the IVR data file for the IVR dialer locations for user-specific data to be provided by the user to the target IVR system.

20. The method of claim 19, further comprising:
inserting into the IVR data file for the IVR dialer an identification for a user-specified data file where the user-specific data can be found when the IVR dialer needs the user-specified data for the target IVR system.

21. The method of claim 19, further comprising:
inserting an instruction in the IVR data file for the IVR dialer to query the user for real-time input of information by the user.

22. The method of claim 15, further comprising:
preparing a status message for the user by the computerized dialer creation application once a communication with the target IVR system has been completed wherein the status message describes at least one of a completion status for a functional task performed on the target IVR system.

23. The method of claim 15, further comprising:
annotating the IVR data file for the IVR dialer with human-readable comments by the computerized script constructor that describe actions taken by at least one of the IVR dialer and the target IVR system.

24. The method of claim 15 wherein the communication between the user and a dialer creation server comprises a telephonic communication over the plain old telephone lines (POTs) and wherein the transceiver is configured to act as a telephone switch.

25. The method of claim 15 wherein the communication between the user and a dialer creation server comprises an internet communication between a computerized softphone operated by the user and the computerized dialer creation server and wherein the transceiver is configured for internet communications.

26. The method of claim 15 wherein the communication between a computerized dialer creation server and the target IVR system comprises a telephonic communication over the plain old telephone lines (POTs) and wherein the transceiver is configured to operate as a telephone switch.

27. The method of claim 15 wherein the communication between a computerized dialer creation server and the target IVR system comprises an Internet communication and wherein the transceiver is configured to direct internet communications.

28. The method of claim 15, further comprising:
Inserting into the IVR data file indicating which of the user's data should be kept confidential.

* * * * *